(12) United States Patent
Xian et al.

(10) Patent No.: US 6,327,584 B1
(45) Date of Patent: Dec. 4, 2001

(54) APPARATUS AND METHOD FOR USING VERSION CONTROL TO DYNAMICALLY UPDATE FILES WHILE THE FILES ARE AVAILABLE FOR ACCESS

(75) Inventors: Tom Xiaotang Xian, Fremont; Michael John Leonard, San Francisco, both of CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/364,312

(22) Filed: Jul. 30, 1999

(51) Int. Cl.[7] .............................. G06F 17/30; G06F 15/00
(52) U.S. Cl. ................................ 707/1; 707/521; 707/203
(58) Field of Search ...................... 707/1–10, 100–104, 707/200–205, 500, 511, 525

(56) References Cited

U.S. PATENT DOCUMENTS 5,701,423 * 12/1997 Crozier .................................. 345/335
5,805,889 * 9/1998 Van De Vanter ....................... 717/3
6,055,546 * 4/2000 Pongracz et al. .................... 707/202

* cited by examiner

*Primary Examiner*—Hosain T. Alam
*Assistant Examiner*—Alford W. Kindred

(57) ABSTRACT

An apparatus and computer-implemented method for dynamically updating at least one outdated file that is available for access, comprising creating at least one temporary file, where the at least one temporary file corresponds to the at least one outdated file; writing updated information received from an information source to the at least one temporary file through an atomic operation to create at least one updated file, where the at least one updated file corresponds to the at least one outdated file, and is an updated version of the outdated file; creating a second version I.D.; and assigning the second version I.D. to the at least one updated file, where the second version identifies the at least one updated file as the updated version of the outdated file.

29 Claims, 9 Drawing Sheets

APPARATUS AND METHOD FOR USING VERSION CONTROL TO DYNAMICALLY UPDATE FILES WHILE THE FILES ARE AVAILABLE FOR ACCESS

FIELD OF THE INVENTION

This invention pertains to the field of system software, and more specifically to an apparatus and method for using version control to dynamically update files while the files are available for access.

BACKGROUND OF THE INVENTION

This invention originates from a need to dynamically update files that are available for access in a manner that preserves data integrity and that minimizes delays in conveying information to a system user. File updates usually take place dynamically. Dynamic file updates are desirable because a file is updated when and as needed. For example, a file can be updated when scheduled, when new information becomes available, or when requested.

This need can arise in the context of updating files in a networked environment, such as an internetwork or the Internet, where multiple computers have the ability to interact with one another and the ability to access some of the same system resources, such as files (comprising, for example, data or program code) and devices by virtue of being connected to one another via communications facilities. For example, every computer that is connected to a local area network (LAN) is connected by a communications link that enables any computer on the LAN to interact with any other computer on the LAN, via e-mail for instance, and to access the same data, such as an employee address book. Also, computers that are connected to the Internet are connected by gateways which enable computers to communicate with one another, such as via e-mail, and to share some of the same system resources, such as files comprising documents found on a Web page, and files comprising programs such as a search engine. In these systems described, changes made to a file (or files) on any one computer will necessarily affect at least one computer (if not all) in the system. For instance, when the price of a stock, StockA, changes, a file, StockFile comprising stock prices is modified to reflect StockA's new price. When this happens, all computers which access StockFile are affected by the modification to StockFile, i.e., those computers can access StockA's new price.

This need can also arise in the context of updating files in a single computer environment, such as on a personal computer. For example, suppose that a user has a subset of a legal database of annotated statutes (where the subset comprises annotated family law statutes, for example) loaded on a personal computer, and that an updated legal CD-ROM database (comprising all types of annotated statutes, for example) is provided on a quarterly basis. Since the entire database can consume valuable disk space, and since the user only needs a subset of the database, the user can request updated information on an as-needed basis. In this scenario, the user could pull up a child support statute from the database on the personal computer. Wanting to know if recent court cases have cited this statute, the user selects a Refresh button in the window display of the legal database program to access new database information from the CD-ROM.

In both contexts, it is vital that information in the files remain accurate. Moreover, it is desirable that new information become available to a user as soon as possible, and that a user is not prevented from accessing a file while it is updated. For example, in an operating system, a file update is traditionally implemented by locking the file to block access to it, updating the file, and then unlocking the file. On a web site, a file update is usually implemented by shutting down the web site. While the "lockout" method provides users with the current information (i.e., data or code), and accurate information, at least one drawback is that information flow is interrupted because the file being updated can't be accessed during the update process.

One alternative is to give users access to the file while it is being updated. The disadvantage of this method is that it can result in corrupt information if the file is being written to and read simultaneously. Furthermore, it can result in a user receiving inconsistent information if a file is updated during a user's session such that the user sees one set of information before the file update, and another set of information after the file update.

Another alternative is to use a database to implement file updates, rather than traditional direct file access as described above. When a database is used, it is used with schema (a description of a database that defines aspects of the database) and API's (application program interface, or a set of routines that direct the performance of procedures by the computer's operating system). While data consistency and data integrity are maintained using a database, this approach requires significantly more system resources. Furthermore, any web sites which are built around CGI (an acronym for Common Gateway Interface which is a specification that defines communications between information servers and the server's host computer), and direct file access require massive rework to conform with database access standards and protocol.

A need exists, therefore, for an apparatus and method dynamically updating files while they are available for access, such that delay of information is minimized, and system resources are not compromised.

SUMMARY OF THE INVENTION

This invention is, in general, directed to computer-implemented method and apparatus for using version control to dynamically update files while the files are available for access.

Thus, the invention may comprise a computer-implemented method for dynamically updating at least one outdated file, wherein each of the at least one outdated files is continuously available for access, and comprises a first version I.D., the computer-implemented method comprising creating at least one temporary file, wherein the at least one temporary file corresponds to the at least one outdated file; writing updated information received from an information source to the at least one temporary file to create at least one updated file, wherein the at least one updated file corresponds to the at least one outdated file, is an updated version of the at least one outdated file, and is created from writing to the at least one temporary file through an atomic operation; creating a second version I.D.; and assigning the second version I.D. to the at least one updated file, wherein the second version I.D. identifies the updated file as an updated version of the outdated file.

The invention may further comprise a computer-implemented method for dynamically updating at least one outdated file, wherein each of the at least one outdated files is continuously available for access, and comprises a first version I.D., the computer-implemented method comprising receiving an indication to update at least one file, wherein the at least one file then becomes at least one outdated file; creating at least one temporary file, wherein the at least one temporary file corresponds to the at least one outdated file; writing updated information received from an information source to the at least one temporary file to create at least one updated file, wherein the at least one updated file corresponds to the at least one outdated file, is an updated version of the at least one outdated file, and is created from writing to the at least one temporary file through an atomic operation; creating a second version I.D.; assigning the second version I.D. to the at least one updated file, wherein the second version I.D. identifies the updated file as an updated version of the outdated file; and reading the first version I.D. assigned to the at least one outdated file, reading the second version I.D. assigned to the at least one updated file, and selecting the at least one updated file over the at least one outdated file.

This invention may also comprise a computer-implemented method for dynamically updating at least one outdated file, wherein each of the at least one outdated files is continuously available for access, and comprises a first version I.D., the computer-implemented method comprising means for creating at least one temporary file, wherein the at least one temporary file corresponds to the at least one outdated file; means for writing updated information received from an information source to the at least one temporary file to create at least one updated file, wherein the at least one updated file corresponds to the at least one outdated file, is an updated version of the at least one outdated file, and is created from writing to the at least one temporary file through an atomic operation; means for creating a second version I.D.; and means for assigning the second version I.D. to the at least one updated file, wherein the second version I.D. identifies the updated file as an updated version of the outdated file.

This invention may further comprise an apparatus for dynamically updating files, wherein each of the at least one outdated files comprises a first version I.D., the apparatus comprising a number of computer readable media; and computer readable program code stored on the computer readable media, the program code comprising program code for creating at least one temporary file, wherein the at least one temporary file corresponds to the at least one outdated file; program code for writing updated information received from an information source to the at least one temporary file to create at least one updated file, wherein the at least one updated file corresponds to the at least one outdated file, is an updated version of the at least one outdated file, and is created from writing to the at least one temporary file through an atomic operation; program code for creating a second version I.D.; and program code for assigning the second version I.D. to the at least one updated file, wherein the second version I.D. identifies the updated file as an updated version of the outdated file.

The invention may further comprise an apparatus for dynamically updating at least one outdated file, wherein each of the at least one outdated files is continuously available for access, and comprises a first version I.D., the apparatus comprising a number of computer readable media; and computer readable program code stored on the computer readable media, the program code comprising program code for receiving an indication to update at least one file, wherein the at least one file then becomes at least one outdated file; program code for creating at least one temporary file, wherein the at least one temporary file corresponds to the at least one outdated file; program code for writing updated information received from an information source to the at least one temporary file to create at least one updated file, wherein the at least one updated file corresponds to the at least one outdated file, is an updated version of the at least one outdated file, and is created from writing to the at least one temporary file through an atomic operation; program code for creating a second version I.D.; program code for assigning the second version I.D. to the at least one updated file, wherein the second version I.D. identifies the updated file as an updated version of the outdated file; and program code for reading the first version I.D. assigned to the at least one outdated file, reading the second version I.D. assigned to the at least one updated file, and for selecting the at least one updated file over the at least one outdated file.

BRIEF DESCRIPTION OF THE DRAWINGS

Illustrative and presently preferred embodiments of the invention are illustrated in the drawings in which.

DESCRIPTION OF PREFERRED EMBODIMENTS

Figure 1:
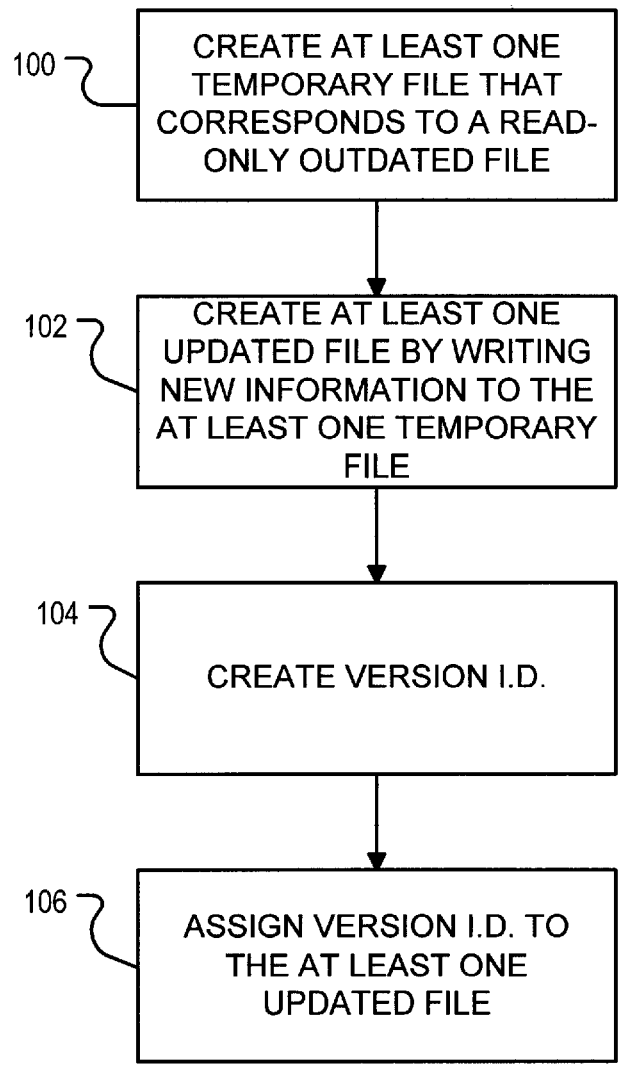
FIG. 1 illustrates a method for dynamically updating files using version control.

FIG. 1, in general, illustrates a method for using version control to dynamically update at least one outdated file, where the outdated file is continuously available for access, comprising creating at least one temporary file to correspond to the at least one outdated file 100, creating at least one updated file by writing information received from an information source to the at least one temporary file 102, creating a version identification 104, and assigning the version identification to the at least one updated file 106.

Figure 3:
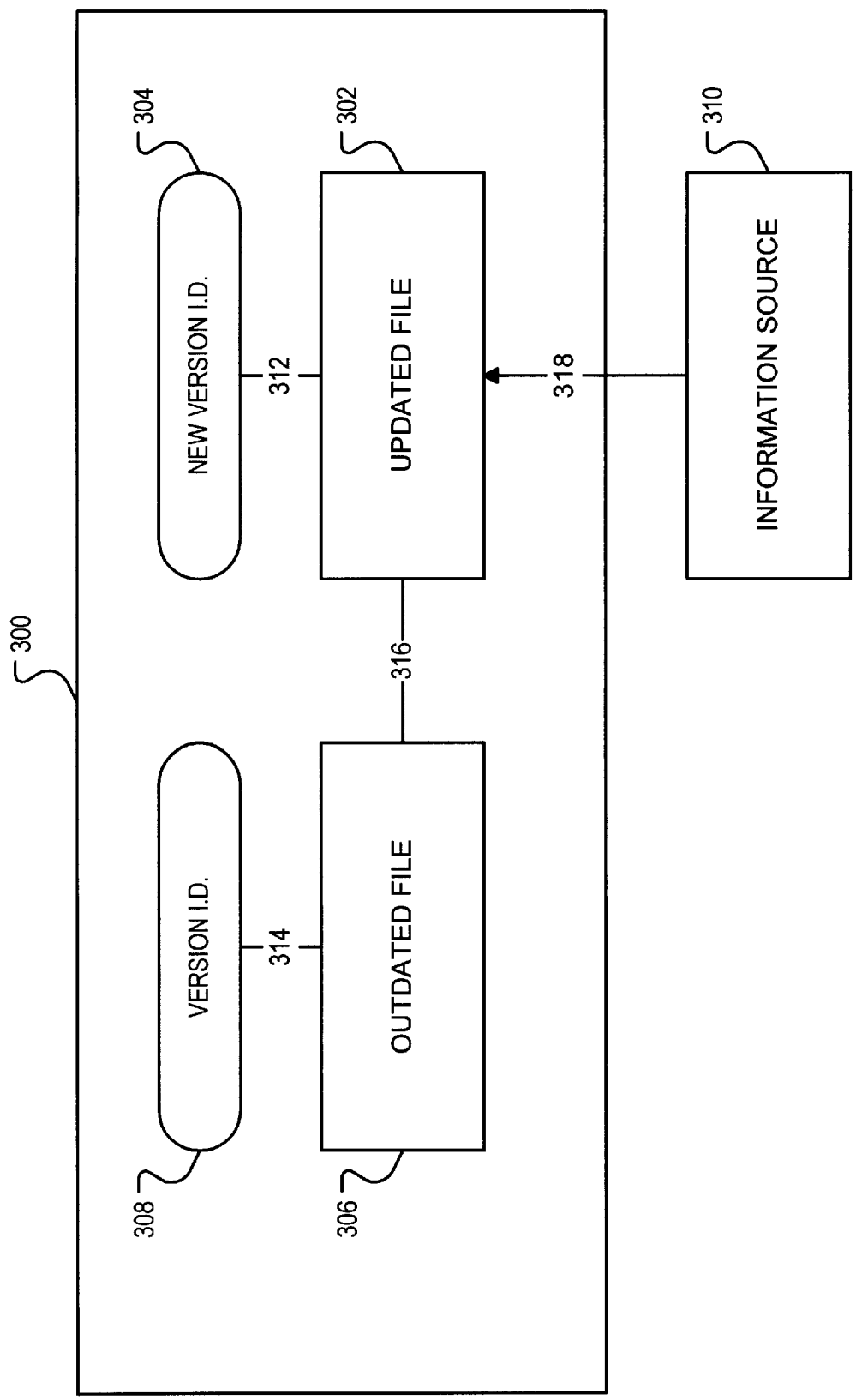
FIG. 3 illustrates an apparatus for dynamically updating files using version control.

FIG. 3, in general, illustrates an apparatus for using version control to dynamically update at least one file, where the file is continuously available for access, comprising a number of computer readable media 300; and program code on the computer readable media 300 for creating at least one temporary file 302 (only one shown) corresponding 316 to at least one outdated file 306 (only one shown), wherein the outdated files 306 have a first version identification 308 assigned 314 to the outdated files 306; program code to write 318 information received from an information source 310 to the temporary files 302 to create updated files 302; program code to create a second version identification 304 that is different from the first version identification 308; and program code to assign 312 the second version identification 304 to the updated files 302, wherein the second version identification 304 distinguishes its updated files 302 from the outdated files 306 associated with the first version identification 308. The number of computer readable media illustrated and described throughout this application means one or more, and is not intended to be limited to any number of computers used. It is only intended to illustrate that the apparatus for dynamically updating at least one file using version control operates on computer readable media. In preferred embodiments, outdated files 306 reside on the same computer readable medium 300, such as a client computer on a network, as the updated files 302, and the information source can be a separate computer readable medium, or an operator, for example. In preferred embodiments, the information source is a separate computer readable medium, such as a server on a network, or a CD-ROM on a personal computer.

Introduction

A file is a collection of information, such as data (i.e., stock prices), or program code (i.e., code that is used to access or calculate stock prices). In computing, a file is constantly vulnerable to change. There are many situations in which a file undergoes change, or in which a file needs to be updated. Where a file comprises data, the file can be updated, for example, automatically at predetermined intervals according to a schedule, immediately as new information becomes available, or on demand as requested by a user or a system administrator. Where a file comprises program code, the file can become outdated when a new program version is released, when the program undergoes bug fixes, or when code is modified, for example. Throughout the description, a file that needs to be updated is called an outdated file, which is available for access while being updated.

When an outdated file is updated, an updated file is created. Information in the updated file can then be accessed (or picked up by a safe-read routine, to be discussed) according to a predetermined schedule, immediately, or on demand, much in the same way as when a file can be updated. (Accessing an updated file is different than accessing an outdated file. In this invention, it is essential that the outdated file be available for access while it is being updated, as has been explained, and will be explained in more detail.) The times at which a file can be updated and at which information in the file can be accessed are configurable events that can be dependent upon the situation in which a file is used, or simply dependent on how a system administrator configures the events. For example, if the information consists of stock prices that are used to make a stock purchase decision, it is very likely that users would want the most current information available at all times. Thus, an appropriate configuration in this situation might be to update the stock price file when requested by the user, or immediately as new information becomes available, and to make the stock prices accessible when requested by the user, or as soon as the file is ready. On the other hand, if information consists of stock market values that are used to collect statistical data every hour on the hour, it is more likely that users accessing such information would not want the information to continuously change. In this situation, it could be appropriate to configure the file update to take place immediately, every hour immediately preceding the hour, or when requested by the user, and to configure the accessibility of the file to take place only when requested, or every hour on the hour. Where the information comprises program code, a most likely configuration is for an update to take place on demand by a system administrator, and accessibility when needed by an operating system, for example. While the actual configuration of updates and accessibility are outside the scope of this invention, they are mentioned so that one can appreciate the various situations in which this invention can apply. It should be understood that accessing a file does not trigger the update process described herein, as a file can be updated well before its information is accessed.

This invention is applicable to at least one file. Therefore, it is applicable to a single file, and it is applicable to multiple files. For the purpose of simplicity, however, references to a single file are equally applicable to multiple files, and references to multiple files are equally applicable to a single file, unless otherwise stated. (These files include outdated files, temporary files, as well as updated files, as will be discussed in more detail below.)

In this invention, files are associated with a version identification (hereinafter version I.D.) which identifies the version of the file it is assigned to, allowing an outdated file to be distinguished from an updated file. In preferred embodiments, the version I.D. is a timestamp, comprising sufficient information to distinguish a file updated at one point in time from a file updated at another point in time. For example, a timestamp may comprise a month, day, year, hour, minute, and seconds. Also, a version I.D. is an extension of an object name prefix, where the object can be a file, directory, cache (such as one used in a web browser), or any other dynamically or statically created computer object that comprises information or other objects.

FIG. 3 illustrates an apparatus for dynamic file update using version control. When a file becomes outdated, a temporary file 302 is created which becomes a receptacle for updated information. An outdated file 306 has a version I.D. 308 assigned 314 to it. In a preferred embodiment, each temporary file 302 corresponds 316 to an outdated file 306 so that there is a one-to-one correspondence 316 between a temporary file 302 and an outdated file 306, although a one-to-one correspondence is not necessary. The correspondence is such that the temporary file is to comprise the same information as the outdated file, plus updated information. The updated information is obtained 318 from an information source 310. An information source can be a data file on a stock exchange server, a program file (comprising program code) from a development library, or both, for example. Once updated information is written 318 to the temporary file 302, the temporary file 302 becomes an updated file 302, which is a file that comprises updated information. A new version I.D. 304, which is unique and different from the version I.D. 308 assigned 314 to the outdated file 306, is created and assigned 312 to the updated file 302. Since the new version I.D. 304 assigned 312 to the updated file 302 is different from the version I.D. 308 assigned 314 to the outdated file 306, the updated file 302 can be distinguished from its corresponding 316 outdated file 306.

This allows a file to be continuously available for access. A file can be accessed, for example, by a system user who can continue to view to a given file (an outdated file) while the file is updated, or by a computer process checking the file for viruses in the file while it is being updated. While an outdated file is available for access (although the file does not have to be accessed for the invention to work), a temporary file is created to receive updated information for the outdated file that the user is presently using. The temporary file becomes an updated file by virtue of having received updated information, and the updated file is then assigned a filename and a version I.D. The temporary file can be a copy of the outdated file, in which case the temporary file only receives updates to the outdated file, or the temporary file can be an empty file, in which case the temporary file receives the entire contents of the outdated file including updates. In either case, the temporary file receives updated information for the outdated file to become an updated file. The transition from a temporary file to an updated file is an atomic operation. In other words, the process of writing updated information to the temporary file is complete and indivisible such that the updated information comprises all of the updated information that is then available.

The next time updated information is requested, by a user logging in or requesting information, for example, or by some other process such as a scheduled update, the filename having the most recent version I.D. is picked up. At all times, therefore, any given outdated file which has been updated at least once will be associated with multiple versions, where a configurable subset of the versions are older versions which are currently accessed by a system user while updates are made, and one version is the most recently updated version. In preferred embodiments, a reader requests information from a given file having a specific filename so that it can process the information from that file. For example, a reader can be an operating system that reads user login information from a data file, USERDATA, or that invokes a startup program in a program file, STRTPGM. A reader can also be a main program that accesses data from a data file, DTA, or that invokes a subprogram in a program file, SUBPGM.

To request information from a file, a reader implements a routine to locate the most current version of the file available, the routine hereinafter referred to as a safe-read routine. The safe-read routine looks for the file indicated by the reader. When the safe-read routine encounters multiple files of the same filename, USERDATA, for example, the safe-read routine looks to the version I.D. assigned to each file it encounters to determine which file was most recently updated. A file is selected, and then returned to the reader, which then processes the information in the file. A reader and safe-read routine can reside on the same computer readable medium as the files they access, or on a different computer readable medium. Moreover, it is not necessary that both the reader and safe-read routine reside on the same computer-readable medium.

Figure 2:
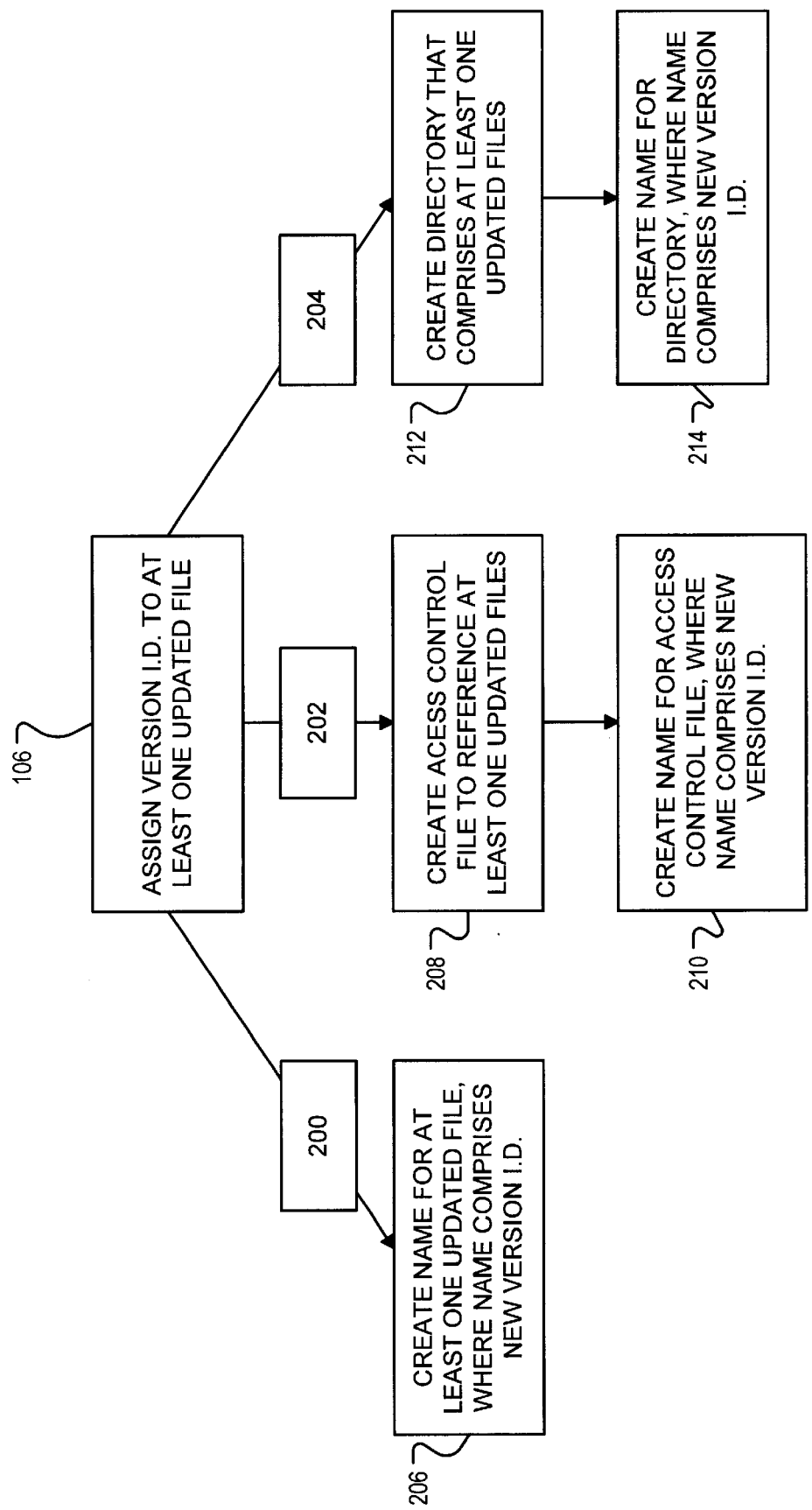
FIG. 2 illustrates preferred embodiments for implementing version control.

As illustrated in FIG. 2, there are several ways to implement version control, all of which involve assigning a unique version I.D. to an updated file in order to distinguish the updated file from its corresponding outdated file.

First Preferred Embodiment

Figure 4:
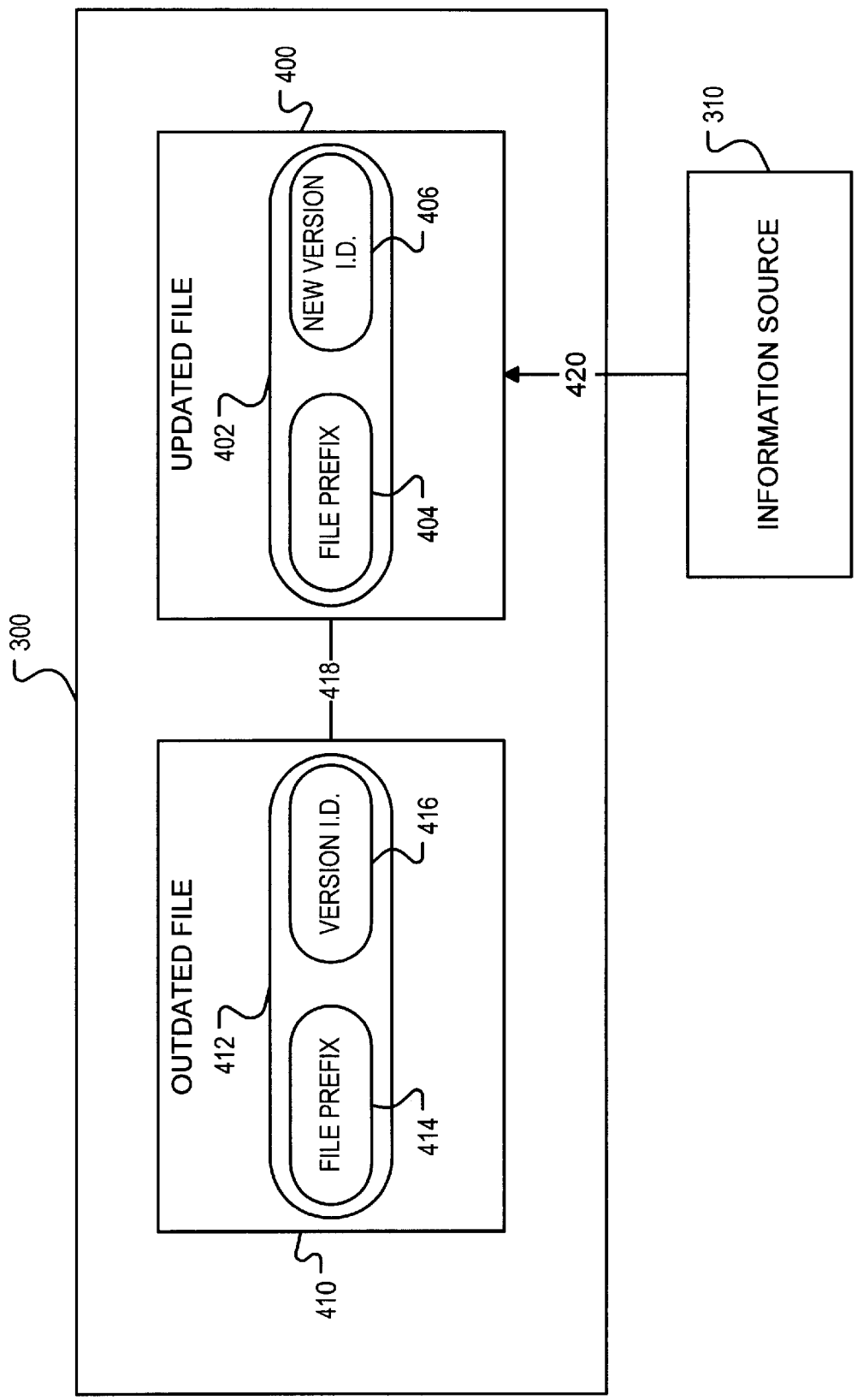
FIG. 4 illustrates an apparatus for implementing version control in a first preferred embodiment.

In method 200, as illustrated in FIG. 4, a temporary file 400 is created for its corresponding 418 outdated file 410. The outdated file 410 has a version I.D. 416 assigned to it by virtue of its filename 412 comprising the version I.D. 416. The temporary file 400 receives 420 updated information from an information source 310. When the updated information is written 420 to the temporary file 400, the temporary file becomes an updated file 400. A new version I.D. 406 is created, which is then assigned to the updated file 400.

This assignment is accomplished by creating a filename 206, 402 for the updated file 400, where the filename 402 comprises an extension that is the new version I.D. 406. The new extension 406, or the version I.D. 406, allows the outdated file 410 (comprising version I.D. 416) to be distinguished from its corresponding 418 updated file 400 (comprising new version I.D. 406). The filename 402 also comprises a prefix 404 which is the same as the old filename prefix 414 so that the updated file 400 can be identified as a file that corresponds to 418 to the outdated file 410.

Uses in a First Preferred Embodiment

This embodiment is preferred where any given outdated file is an independent file that is not dependent on another file, and does not comprise information that another file must depend on.

Architecture in a First Preferred Embodiment

Figure 5:
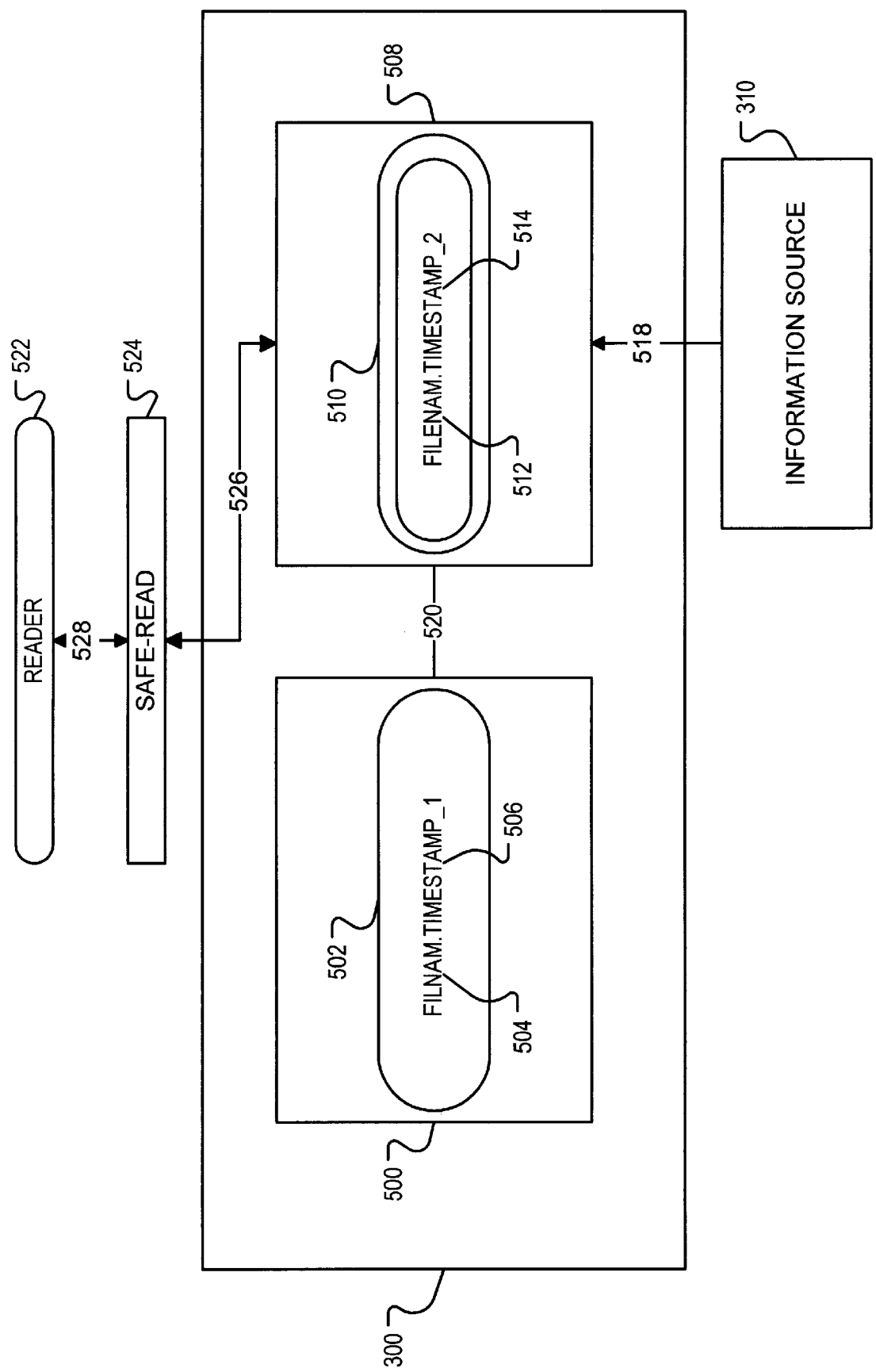
FIG. 5 illustrates an example of an architecture for implementing version control in a first preferred embodiment.

In FIG. 5, for example, a file 500 named FILNAM.TIMESTAMP_1, where the name 502 comprises a filename prefix 504 FILNAM, and an extension 506 TIMESTAMP_1, which is the version I.D., becomes outdated. For example, FILNAM.TIMESTAMP_1 is a file 500 comprising stock prices, and an indication to update stock prices is received (for instance, the system is configured to update the stock price file whenever stock prices change, or a system user has requested updated information). A temporary file 508 corresponding 520 to the outdated file 500, is created. When the new stock price data from an information source 310 is written 518 to the temporary file 508, the temporary file 508 becomes an updated file 508. A new version I.D. 514, TIMESTAMP_2, is created and then assigned to the updated file 508. During this process, system users will only see outdated files. Since the update process (i.e., writing updated information to a temporary file to create an updated file) is atomic, system users will not see the updated files until they are complete.

This assignment is accomplished by creating a name 510 for the updated file 508, where the name 510 comprises a new filename prefix 512, taken from the old filename prefix 504, FILNAM, and the new version I.D. 514. The name 510 created for the updated file 508 is FILNAM.TIMESTAMP_2, where the filename extension, TIMESTAMP_2 distinguishes the updated file 508 from the outdated file 500 having a filename extension 506 TIMESTAMP_1.

In a preferred embodiment, a reader 522 then uses a safe-read routine 524 to pick up 526 a file having the most current version control identification. For example, a reader 522 searching for a file FILNAM will invoke 528 a safe-read routine 524, which will look for files having filename prefix FILNAM. Since the safe-read routine 524 encounters two files having the same filename prefix, it looks to the extension to determine which one was most recently updated. In this case, the safe-read routine 524 picks up 526 FILNAM.TIMESTAMP_2 over FILNAM.TIMESTAMP_1 since FILNAM.TIMESTAMP_2 has the most current version I.D. The safe-read routine 524 returns 528 this file to the reader 522, which in turn processes information in the file, which can be data or program code.

Since file locking is not used in this invention, a user always has access to any given file on the system, including the time that the file is being updated. New information becomes instantaneously available through a safe-read routine when the user requests new information, or when a user signs on to a new session, for example.

Second Preferred Embodiment

Figure 6:
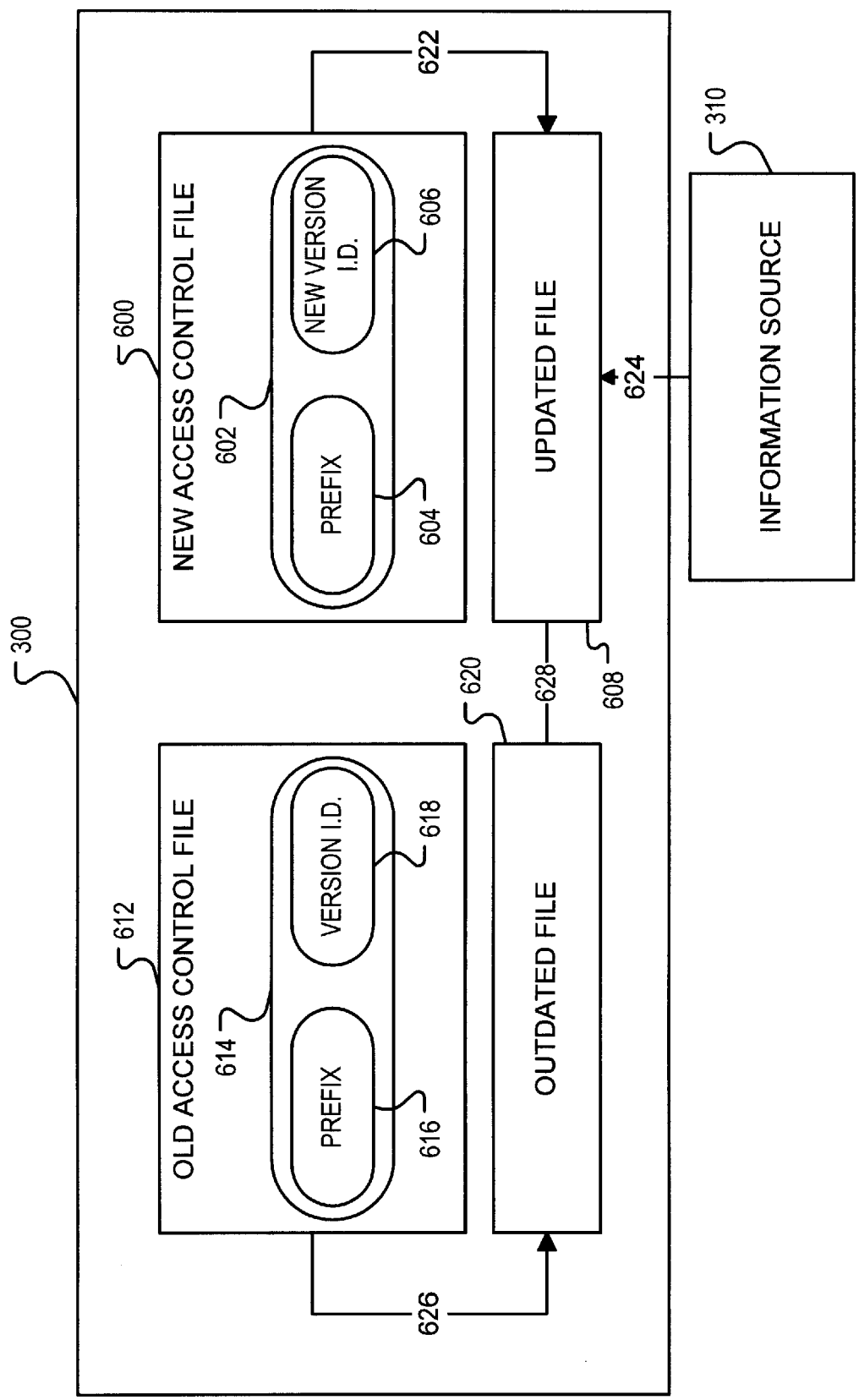
FIG. 6 illustrates an apparatus for implementing version control in a second preferred embodiment.

In method 202, as illustrated in FIG. 6, a temporary file 608 is created for its corresponding 628 outdated file 620, which has a version I.D. 618 assigned to it. Unlike method 200, however, the outdated file 620 has a unique version I.D. 618 assigned to it by virtue of the outdated file 620 being referenced 626 by a corresponding access control file 612 comprising the version I.D. 618. Thus, the version I.D. 618 is indirectly assigned to the outdated file 620 since the outdated file 620 does not comprise the version control I.D 618 itself. Information from an information source 310 is written 624 to the temporary file 608. When the updated information has been written 624, the temporary file 608 becomes an updated file 608. A new version I.D. 606 is created, which is then assigned to the updated file 608.

In method 202, this assignment is accomplished by creating a new access control file 208, 600 to reference 622 the updated file 608, and then creating a filename 210, 602 for the new access control file 600, where the filename 602 comprises the new version I.D. 606. The new extension 606, or the version I.D. 606, allows the old access control file 612 (comprising an old version I.D. 618) to be distinguished from the new access control file 600 (comprising a new version I.D. 606). The filename 602 also comprises a prefix 604 taken from the prefix 616 of the old access control file 612 name 614 (the access control file 612 that references 626 the outdated file 620), The new access control file 600 name 602 also comprises a prefix 604 which is the same as the old access control file 612 name 614 prefix 616 so that the new access control file 600 can be identified as an access control file that corresponds to the old access control file 612, Since the old access control file 612 references 626 the outdated file 620, and the new access control file 600 references 622 the updated file 608, the old version I.D. 618 is indirectly assigned to the outdated file 620, and the new version I.D. 606 is indirectly assigned to the updated file 608. As a result, the old version I.D. 618 distinguishes the outdated file 620 from the outdated file's 620 corresponding 628 updated file 608, and the new version I.D. 606 distinguishes the updated file 608 from the updated file's 608 corresponding 628 outdated file 620. In preferred embodiments, an access control file 600 points to an updated file 608 or an outdated file 620 to reference 622 the files.

Uses in a Second Preferred Embodiment

This embodiment is preferred where any given outdated file is related to at least one other file, and the files are not located in the same directory, library, or other "catalog" for grouping files. A first file is related to one or more second files if the first file depends on the one or more second files and/or the one or more second files depend on the first file. If the files are not located in the same directory, library, or other "catalog" for grouping files, then the files are dispersed throughout memory, or other computers, and are not collectively located. Since the files are related, they should be updated at the same time since a change or modification to one file will affect the other related files.

Since there is a desire to maintain a consistent state for the duration of a user's session (for example, a user does not want to see one set of data at the beginning of a session, and then another set of data in the middle of the session), this embodiment is also useful for updating dependent data because it guarantees consistent data during a user's session. During session login, such as when a user is logged onto the Internet, certain information is initialized and loaded into session memory for a particular user. For example, pointers to files comprised by an access control file are stored in session memory at session login. Thus, for the duration of a first user's session, the first user will have access to the same information because the pointers stored in the first user's session memory point to the same files as when the first user logged in. If the files are updated during the first user's session, a new access control file is created to point to updated files. However, because the pointers to the first user's files are stored in the first user's session memory, the updated files will not be picked up. When a second user logs in, a safe-read routine will pick-up the most current access control file, and store pointers to the second user's files in the second user's session memory. As a result, both users see the same information throughout their respective sessions. If the first user logs off and logs back onto a new session, a new session memory is created so that the first user will be able to access updated information.

Architecture in a Second Preferred Embodiment

Figure 7:
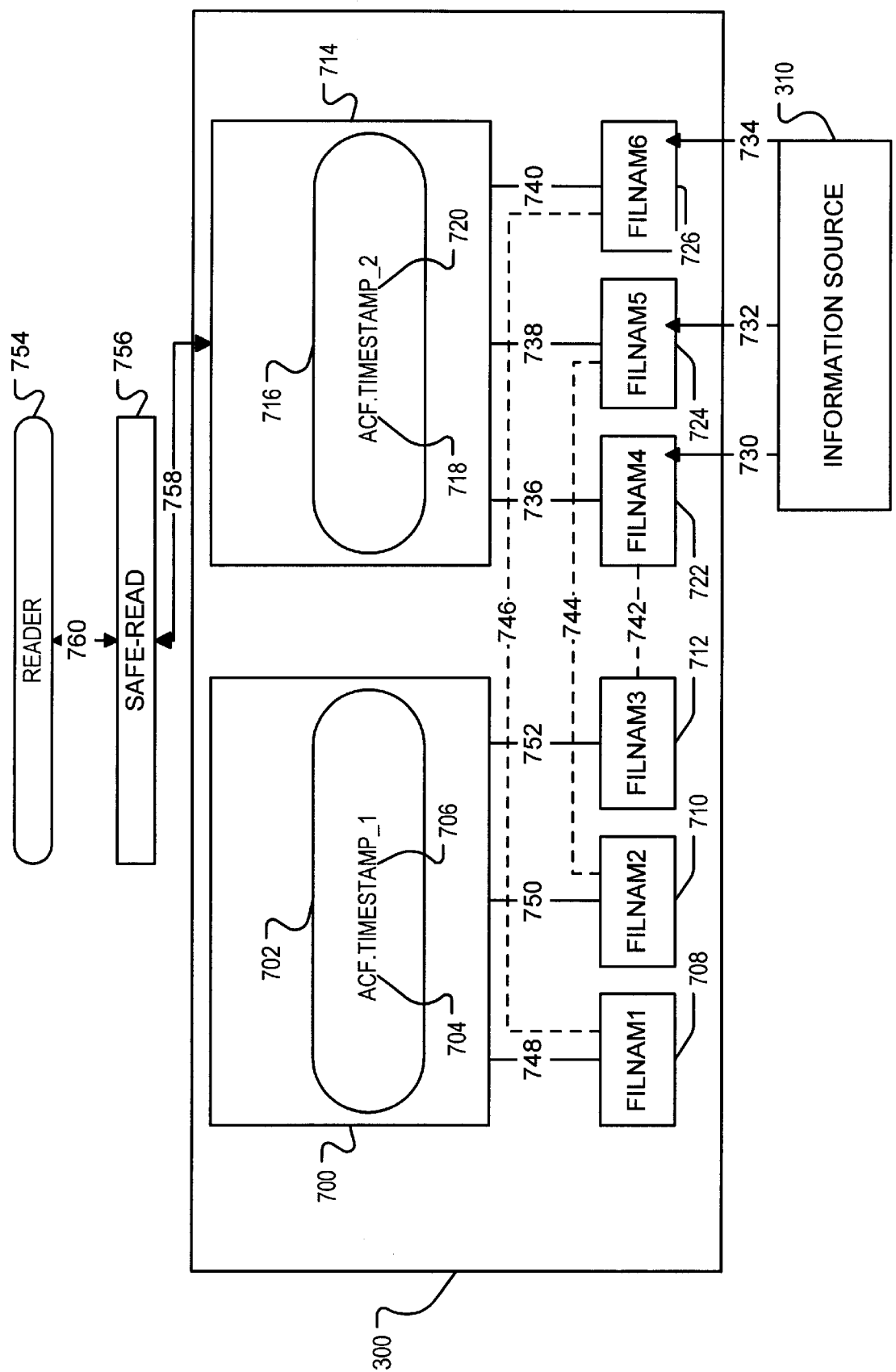
FIG. 7 illustrates an example of an architecture for implementing version control in a second preferred embodiment.

In FIG. 7, for example, one or more files in a group of related files FILNAM1 708, FILNAM2 710, FILNAM3 712, which are not collectively located, become outdated. This situation may arise where, for example, data files are located in a different directory than related source code (which is common practice in software development). Thus, FILNAM1 708 could be a physical data file (a file comprising data), FILNAM2 710 could be a logical data file (a file, such as an index or a view, comprising organized data, where the data corresponds to a related physical data file), and FILNAM3 712 could be a source file (a file comprising program code, which in this example uses the physical and logical data files). An extra data field is added to FILNAM1 708 so that the related logical data file FILNAM2 710 must be modified (or at least recompiled), and the related source file FILNAM3 712, must be modified to reference the new data field. From a user's perspective, a user would see an extra data field when the user refreshes his screen. If there are added, deleted, or modified records in one of the data files, the user would also see different data.

In a second preferred embodiment, an access control file 700 references 748, 750, 752 the related, outdated files 708, 710, 712. The access control file 700 comprises a filename 702 ACF.TIMESTAMP_1, where the filename comprises a filename prefix 704, ACF, and an extension 706 TIMESTAMP_1, which is the unique version I.D. When a file (or files) needs to be updated, one or more corresponding 742, 744, 746 temporary files FILNAM4 722, FILNAM5 724, FILNAM6 726 are created to receive 730, 732, 734 new information from an information source 310. When the information is written 730, 732, 734 to the temporary files 722, 724, 726, the temporary files 722, 724, 726 become updated files 722, 724, 726. A new version I.D. 720 is created and then assigned to the updated files 722, 724, 726.

This assignment is accomplished by creating a new access control file 714 to reference 736, 738, 740 the updated files 722, 724, 726 so that when a name 716 is created for the new access control file 714, where the name 716 comprises a prefix 718 and a new version I.D. 720, the new version I.D. 720 is indirectly assigned to the updated files 722, 724, 726. Thus, the new access control file 714 has a filename 716 ACF.TIMESTAMP_2, where ACF is the filename prefix 718 that is obtained from the old access control file 700 name 702 prefix 704, and TIMESTAMP_2 is the extension 720 that is the new version I.D. 720. During this process, system users will only see outdated files. Since the update process (i.e., writing updated information to a temporary file to create an updated file) is atomic, system users will not see the updated files until they are complete.

In a preferred embodiment, a reader 754, uses a safe-read routine 756 to pick up 758 a particular access control file (which has been predetermined to reference a certain set of files) having the most current version I.D. in order to access information in the files referenced by the access control file. For example, a reader 754 searching for an access control file ACF comprising FILNAM1, FILNAM2, and FILNAM3 will invoke 760 a safe-read routine 756, which will look for access control files having an access control filename prefix of ACF. Since the safe-read routine 756 encounters two access control files having the same access control file name prefix, it looks to the access control file extension to determine which one was most recently updated. In this case, the safe-read routine 756 will pick-up ACF.TIMESTSAMP_2 over ACF.TIMESTAMP_1 since ACF.TIMESTAMP_2 has the most current version control identification. The safe-read routine 756 returns 758 the most current access control file to the reader 754, which in turn processes information in the set of files comprised by the access control file, which can be data or program code.

Since file locking is not used in this invention, a user always has access to any given file on the system, including the time that the file is being updated. New information becomes instantaneously available through a safe-read routine when the user requests new information, or when a user signs on to a new session, for example. Furthermore, where multiple files are involved, this embodiment is an efficient implementation of version control because version control is only applied to one file (i.e., timestamping a single access control file), rather than each of the updated files.

Third Preferred Embodiment

Figure 8:
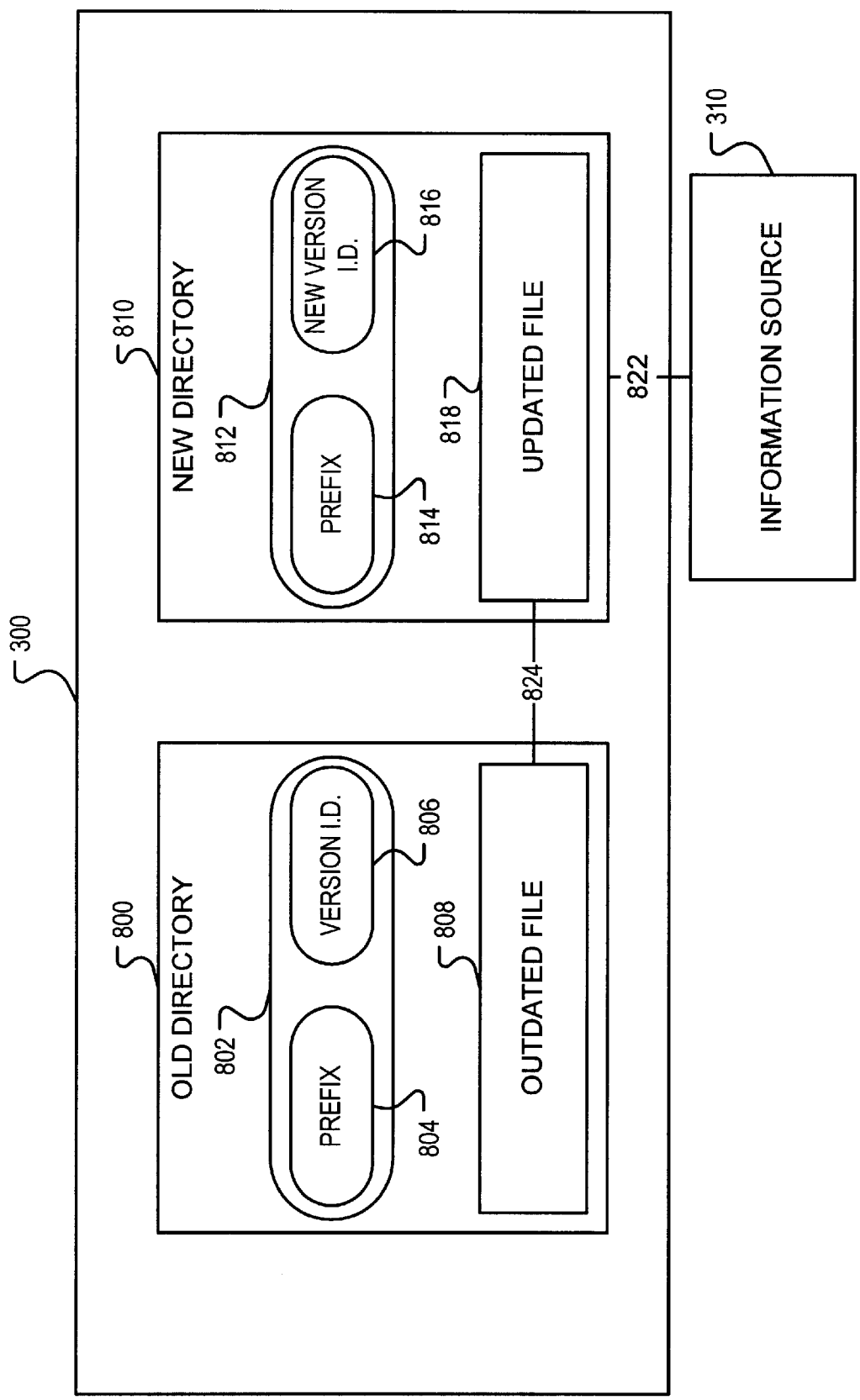
FIG. 8 illustrates an apparatus for implementing version control in a third preferred embodiment.

In method 204, as illustrated in FIG. 8, a temporary file 818 is created for its corresponding 824 outdated file 808, which has a version I.D. 806 assigned to it. The outdated file 808 has a version I.D. 806 assigned to it by virtue of a corresponding directory 800 comprising the version I.D. 806. Like method 202, a version I.D. is indirectly assigned to an outdated file 808 since the outdated file 808 does not comprise the unique version control I.D 806 itself. The temporary file 818 receives 822 updated information from an information source 310. When the updated information has been written 822, a unique version I.D. 816 is created, which is then assigned to the updated file 818.

In method 204, this assignment is accomplished by creating a new directory 212, 810 to comprise the updated file 818, and then creating a name 214, 812 for the new directory, where the name 812 comprises the new version I.D. 816. The new extension 816, or the version I.D. 816, allows the old directory 800 (comprising an old version I.D. 806) to be distinguished from the new directory 810 (comprising a new version I.D. 816). The directory name 812 also comprises a prefix 814 taken from the prefix 804 of the old directory 800 name 802 (the directory comprising the outdated file 808). The new directory name 812 also comprises a prefix 814 which is the same as the old directory name prefix 804 so that the new directory 810 can be identified as a directory that corresponds to the old directory 800.

Since the old directory 800 comprises the outdated file 808, and the new directory 810 comprises the updated file 818, the old version I.D. 806 is indirectly assigned to the outdated file 808, and the new version I.D. 816 is indirectly assigned to the updated file 818. As a result, the old version I.D. 806 distinguishes the outdated file 808 from the outdated file's 808 corresponding 824 updated file 818, and the new version I.D. 816 distinguishes the updated file 818 from the updated file's 818 corresponding 824 outdated file 808.

Uses in a Third Preferred Embodiment

This embodiment is preferred where any given outdated file is related to at least one other file, and the files are located in the same directory, library, or other "catalog" for grouping files. As defined in a second preferred embodiment, a first file is related to one or more second files if the first file depends on the one or more second files and/or the one or more second files depend on the first file. In a third embodiment, the files are collectively located. Since the files are related, the related files should be updated at the same time since a change or modification to one file will affect the other related files.

Architecture in a Third Preferred Embodiment

Figure 9:
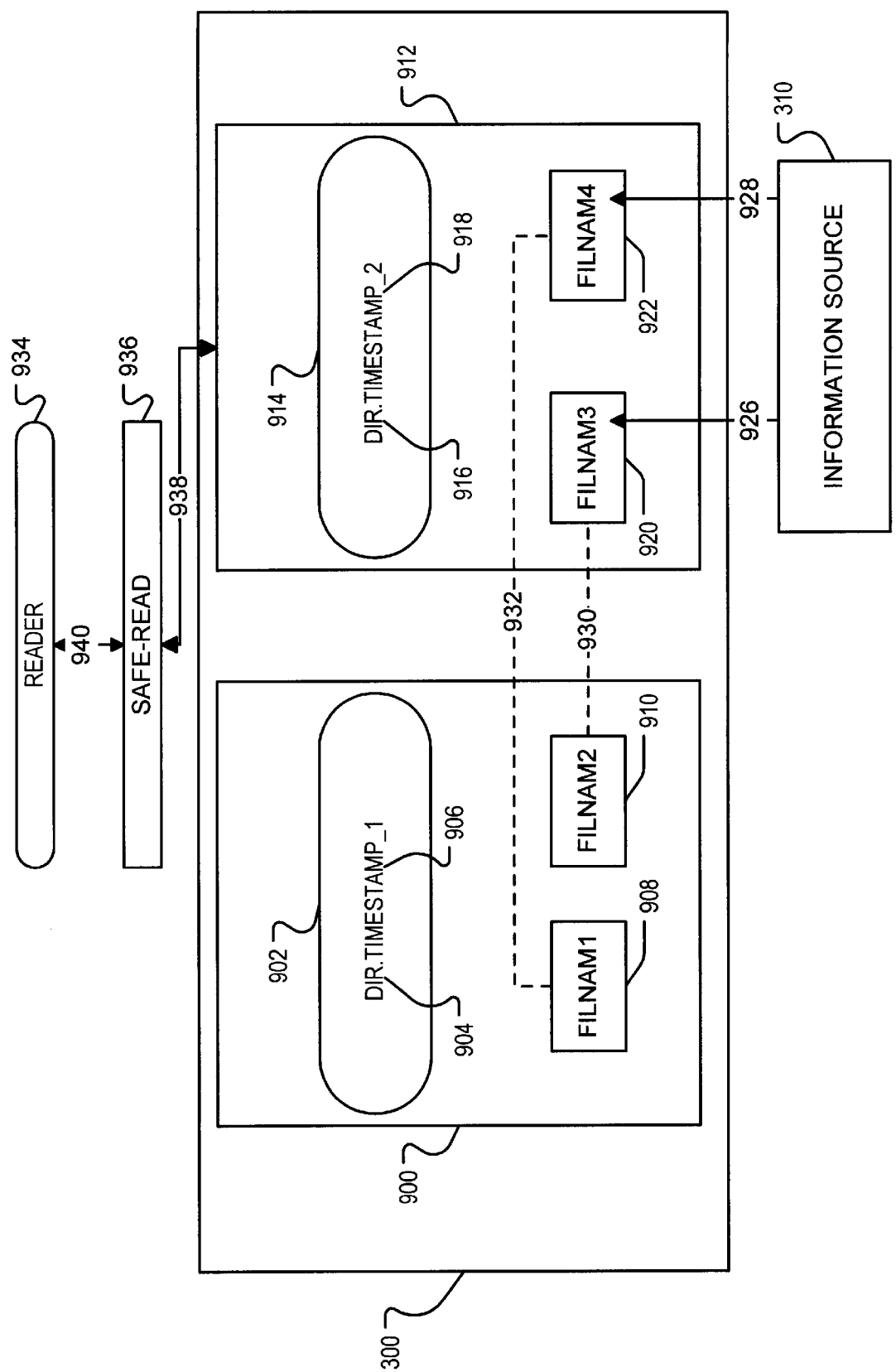
FIG. 9 illustrates an example of an architecture for implementing version control in a third preferred embodiment.

In FIG. 9, for example, one or more files in a group of related files FILNAM1 908, and FILNAM2 910, which exist in the same directory 900, DIR.TIMESTAMP_1, for example, become outdated. This situation may arise where related data files for an accounts receivable department, for example, reside in the same directory, and a new record is being added to one data file that affects a related data file. From a user's perspective in this scenario, a user would see different data.

In this embodiment, a directory 900 comprises the related, outdated files FILNAM1 908, and FILNAM2 910. The directory 900 comprises a directory name 902, DIR.TIMESTAMP_1, where the directory name comprises a prefix 904 DIR, and an extension 906 TIMESTAMP_1 which is the version I.D. When a file (or files) needs to be updated, one or more corresponding 930, 932 temporary files FILNAM3 920 and FILNAM4 922 are created to receive 926, 928 new information from an information source 310. (The filenames of the temporary files have the same name as the outdated files here for the purpose of illustrating that the temporary files correspond to the outdated files. However, other ways of implementing this relationship may be used. For example, if filenames conflict for any reason, the filenames may comprise some kind of a prefix, suffix, or extension to differentiate the updated files from the outdated files.) Although both files 920, 922 are shown to receive new information, this is not required for the invention to work. It is possible for a subset of the files receive new information, while related files that do not have updated information, comprise existing information. For example, if there are three related files, A, B, and C, and file B has updated information, information for new files A and C can be obtained from existing files A and C (via a copy command, for example) while information for new file B can be obtained from an information source.

When the information is written 926, 928 to the temporary files 920, 922, the temporary files 920, 922 become updated files 920, 922. A new version I.D. 918 is created and then assigned to the updated files 920, 922. This assignment is accomplished by creating a new directory 912 comprising the updated files 920, 922 so that when a name 914 is created for the new directory 912, where the name 914 comprises a prefix 916 and an extension 918 that acts as a version I.D. 918, the version I.D. 918 is indirectly assigned to the updated files 920, 922. Thus, the new directory 912 has a directory name 914 DIR.TIMESTAMP_2, where DIR is the directory name prefix 916 obtained from the old directory 900 name 902 prefix 904, and TIMESTAMP_2 is the extension 918 that is the new version I.D. 918. During this process, system users will only see outdated files. Since the update process (i.e., writing updated information to a temporary file to create an updated file) is atomic, system users will not see the updated files until they are complete.

In a preferred embodiment, a reader 934 uses a safe-read routine 936 to pick up 938 a particular directory (which has been predetermined to comprise a certain set of files) having the most current version I.D. in order to access information in the files comprised by the directory. For example, a reader 934 searching for a directory DIR comprising FILNAM1 and FILNAM2 will use a safe-read routine, which will look for directories having a directory name prefix of DIR. Since the safe-read routine 936 encounters two directories having the same directory name prefix, it looks to the directory extension to determine which one was most recently updated. In this case, the safe-read routine 936 to pick up 938 directory DIR.TIMESTAMP_2 over DIR.TIMESTAMP_1 since DIR.TIMESTAMP_2 has the most current version I.D. The safe-read routine 938 returns the most current directory to the reader, which in turn processes information in the set of files in the directory, which can be data or program code.

Since file locking is not used in this invention, a user always has access to any given file on the system, including the time that the file is being updated. New information becomes instantaneously available through a safe-read routine when the user requests new information, or when a user signs on to a new session, for example. Furthermore, where multiple files are involved, this embodiment is an efficient implementation of version control because version control is only applied to one file (i.e., timestamping a directory), rather than each of the updated files.

Conclusion

This invention solves the need to dynamically update a file without disrupting service to a system user by eliminating the need to lock an outdated file while it is updated, thereby maintaining the user's access to the file. For example, if a system user is logged onto an Internet session, and wants to obtain the current price of StockA, where StockA can be obtained from a server comprising StockFile, a user might select a Refresh icon on the web page to make such a request. While the file is updated in the fashion discussed above, other users can obtain stock prices of other stocks because file StockFile can still be accessed. Similarly, if a system user is using a personal computer, the user can update a file on the computer's hard drive (from an information source such as a CD-ROM, for example) while the user is accessing the database. Thus, if the user wants to update annotated family law statutes currently on the hard drive, the user might pull up a record comprising the statute and relevant cases, select a Refresh icon from the program user interface, and wait for the CD-ROM to update the file. In the meantime, the user still has access to the database that is installed on the hard drive.

This invention also has the advantage of dynamic file updates without compromising system resources, since traditional direct file access is used, eliminating the need to rework current systems, or use up more system resources.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A computer-implemented method for dynamically updating at least one outdated file, wherein each of said at least one outdated file is continuously available for access, and comprises a first version I.D., said computer-implemented method comprising:

creating at least one temporary file, wherein said at least one temporary file corresponds to said at least one outdated file;

writing updated information received from an information source to said at least one temporary file to create at least one updated file, wherein said at least one updated file:

corresponds to said at least one outdated file;

is an updated version of said at least one outdated file; and is created from writing to said at least one temporary file through an atomic operation;

creating a second version I.D.; and assigning said second version I.D. to said at least one updated file, wherein said second version I.D. identifies said at least one updated file as said updated version of said outdated file.

2. A computer-implemented method as in claim 1, additionally comprising reading said first version I.D. assigned to said at least one outdated file, reading said second version I.D. assigned to said at least one updated file, and selecting said at least one updated file over said at least one outdated file.

3. A computer-implemented method as in claim 2, additionally comprising reading at least one other version I.D.

4. A computer-implemented method as in claim 1, wherein said at least one outdated file is accessed by a user while said at least one outdated file is updated.

5. A computer-implemented method as in claim 1, wherein said dynamically updating at least one outdated file takes place in a networked environment.

6. A computer-implemented method as in claim 1, wherein said creating said at least one temporary file comprises creating at least one temporary file wherein each of said at least one temporary file corresponds to a given one of said at least one outdated file.

7. A computer-implemented method as in claim 1, wherein said creating said second version I.D. that is assigned to said at least one updated file comprises assigning a filename to each of said at least one updated file, wherein said filename comprises said second version I.D.

8. A computer-implemented method as in claim 1, wherein said creating said second version I.D. that is assigned to said at least one updated file comprises:

creating an access control file wherein said access control file references each of said at least one updated file; and assigning a filename to said access control file, wherein said filename comprises said second unique version control number.

9. A computer-implemented method as in claim 1, wherein said creating said second version I.D. that is assigned to said at least one updated file comprises:

creating a directory wherein said directory comprises said at least one updated file; and assigning a name to said directory, wherein said directory name comprises said second version I.D.

10. A computer-implemented method as in claim 1, additionally comprising receiving an indication to update at least one file, wherein said at least one file then becomes said at least one outdated file.

11. A computer-implemented method as in claim 1, wherein said creating said second version I.D. comprises creating a timestamp.

12. A computer-implemented method as in claim 1, wherein said receiving updated information from an information source comprises receiving updated data.

13. A computer-implemented method as in claim 1, wherein said receiving updated information from an information source comprises receiving updated program code.

14. A computer-implemented method for dynamically updating at least one outdated file, wherein each of said at least one outdated file is continuously available for update, and comprises a first version I.D., said computer-implemented method comprising:

receiving an indication to update at least one file, wherein said at least one file then becomes at least one outdated file.

creating at least one temporary file, wherein said at least one temporary file corresponds to said at least one outdated file;

writing updated information received from an information source to said at least one temporary file to create at least one updated file, wherein said at least one updated file:
  corresponds to said at least one outdated file;
  is an updated version of said at least one outdated file; and
  is created from writing to said at least one temporary file through an atomic operation;

creating a second version I.D.;

assigning said second version I.D. to said at least one updated file, wherein said second version I.D. identifies said at least one updated file as said updated version of said outdated file; and reading said first version I.D. assigned to said at least one outdated file, reading said second version I.D. assigned to said at least one updated file, and selecting said at least one updated file over said at least one outdated file.

15. A computer-implemented method for dynamically updating at least one outdated file, wherein each of said at least one outdated file is continuously available for access, and comprises a first version I.D., said computer-implemented method comprising:

means for creating at least one temporary file, wherein said at least one temporary file corresponds to said at least one outdated file;

means for writing updated information received from an information source to said at least one temporary file to create at least one updated file, wherein said at least one updated file:
  corresponds to said at least one outdated file;
  is an updated version of said at least one outdated file; and
  is created from writing to said at least one temporary file through an atomic operation;

means for creating a second version I.D.; and means for assigning said second version I.D. to said at least one updated file, wherein said second version I.D. identifies said at least one updated file as said updated version of said outdated file.

16. An apparatus for dynamically updating at least one outdated file, wherein each of said at least one outdated file is continuously available for access, and comprises a first version I.D., said apparatus comprising:

a number of computer readable media; and computer readable program code stored on said number of computer readable media, said program code comprising:

program code for creating at least one temporary file, wherein said at least one temporary file corresponds to said at least one outdated file;

program code for writing updated information received from an information source to said at least one temporary file to create at least one updated file, wherein said at least one updated file said at least one updated file:
    corresponds to said at least one outdated file;
    is an updated version of said at least one outdated file; and
    is created from writing to said at least one temporary file through an atomic operation;

program code for creating a second version I.D.; and program code for assigning said second version I.D. to said at least one updated file, wherein said second version I.D. identifies said at least one updated file as said updated version of said outdated file.

17. An apparatus as in claim 16, additionally comprising program code for reading said first version I.D. assigned to said at least one outdated file, reading said second version I.D. assigned to said at least one updated file, and for selecting said at least one updated file over said at least one outdated file.

18. An apparatus as in claim 17, additionally comprising program code for reading at least one other version I.D.

19. An apparatus as in claim 16, wherein said at least one outdated file is accessed by a user while said at least one outdated file is updated.

20. An apparatus as in claim 16, wherein said dynamically updating at least one outdated file takes place in a networked environment.

21. An apparatus as in claim 16, wherein said program code for creating said at least one temporary file comprises program code for creating at least one temporary file wherein each of said at least one temporary file corresponds to a given one of said at least one outdated file.

22. An apparatus as in claim 16, wherein said program code for creating said second version I.D. that is assigned to said at least one updated file comprises program code for assigning a filename to each of said at least one updated file, wherein said filename comprises said second unique version control number.

23. An apparatus as in claim 16, wherein said program code for creating said second version I.D. that is assigned to said at least one updated file comprises:
  program code for creating an access control file wherein said access control file references each of said at least one updated file; and
  program code for assigning a filename to said access control file, wherein said filename comprises said second unique version control number.

24. An apparatus as in claim 16, wherein said program code for creating said second version I.D. that is assigned to said at least one updated file comprises:
  program code for creating a directory wherein said directory comprises said at least one updated file; and
  program code for assigning a name to said directory, wherein said directory name comprises said second version I.D.

25. An apparatus as in claim 16, additionally comprising program code for receiving an indication to update at least one file, wherein said at least one file then becomes said at least one outdated file.

26. An apparatus as in claim 16, wherein said program code for creating said second version I.D. comprises program code for creating a timestamp.

27. An apparatus as in claim 16, wherein said program code for receiving updated information from an information source comprises program code for receiving updated data.

28. An apparatus as in claim 16, wherein said program code for receiving updated information from a formation source comprises program receiving updated program code.

29. An apparatus for dynamically updating at least one outdated file, wherein each of said at least one outdated file is continuously available for access, and comprises a first version I.D., said apparatus comprising:

a number of computer readable media; and computer readable program code stored on said number of computer readable media, said program code comprising:

program code for receiving an indication to update at least one file, wherein said at least one file then becomes at least one outdated file;

program code for creating at least one temporary file, wherein said at least one temporary file corresponds to said at least one outdated file;

program code for writing updated information received from an information source to said at least one temporary file to create at least one updated file, wherein said at least one updated file:
corresponds to said at least one outdated file;
is an updated version of said at least one outdated file; and
is created from writing to said at least one temporary file through an atomic operation;

program code for creating a second version I.D.;

program code for assigning said second version I.D. to said at least one updated file, wherein said second version I.D. identifies said at least one updated file as said updated version of said outdated file; and program code for reading said first version I.D. assigned to said at least one outdated file, reading said second version I.D. assigned to said at least one updated file, and for selecting said at least one updated file over said at least one outdated file.

* * * * *